United States Patent
Kinoshita et al.

(10) Patent No.: US 6,653,401 B2
(45) Date of Patent: Nov. 25, 2003

(54) THERMOPLASTIC ELASTOMER COMPOSITION

(75) Inventors: Hideo Kinoshita, Yokohama (JP); Ikuji Ohtani, Yokohama (JP); Takeshi Yasui, Yokohama (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 09/796,481

(22) Filed: Mar. 2, 2001

(65) Prior Publication Data

US 2001/0053816 A1 Dec. 20, 2001

(30) Foreign Application Priority Data

Mar. 2, 2000 (JP) ........................................ 2000-056977

(51) Int. Cl.[7] .......................... C08L 23/08; C08L 25/04
(52) U.S. Cl. ............................ 525/70; 525/75; 525/86; 525/87; 525/88; 525/95; 525/98; 525/99
(58) Field of Search .............................. 525/70, 75, 86, 525/87, 88, 95, 98, 99, 194, 197

(56) References Cited

U.S. PATENT DOCUMENTS

| | | | |
|---|---|---|---|
| 4,889,888 A | * | 12/1989 | Bassi et al. |
| 5,574,105 A | | 11/1996 | Venkataswamy |
| 6,268,438 B1 | * | 7/2001 | Ellul et al. |

FOREIGN PATENT DOCUMENTS

| | | |
|---|---|---|
| JP | 925370 A | 1/1997 |
| JP | 11293046 A | 10/1999 |
| JP | 11293072 A | 10/1999 |

* cited by examiner

Primary Examiner—Jeffrey Mullis
(74) Attorney, Agent, or Firm—Birch, Stewart, Kolasch & Birch, LLP

(57) ABSTRACT

Disclosed is a thermoplastic elastomer composition which comprises (A) a thermoplastic resin containing a polystyrene resin, (B) a rubber-like polymer obtained by partially or completely crosslinking an ethylene-α-olefin copolymer and (C) a compatibilizing agent, the amount of the component (B) being 40–90 parts by weight and the amount of the component (C) being 0.1–40 parts by weight based on 100 parts by weight of the components (A), (B) and (C) in total. According to the present invention, an elastomer composition excellent in abrasion resistance can be provided.

15 Claims, No Drawings

THERMOPLASTIC ELASTOMER COMPOSITION

BACKGROUND OF THE INVENTION

The present invention relates to a thermoplastic elastomer composition excellent in abrasion resistance, and, more particularly, to a thermoplastic elastomer composition comprising a thermoplastic resin containing a polystyrene resin, a rubber-like polymer obtained by partially or completely crosslinking an ethylene-α-olefin copolymer and a compatibilizing agent.

As thermoplastic elastomers, there are known those of diene type, hydrogenated diene type, polyolefin type, polyvinyl chloride type, polyurethane type and polyamide type. Among them, thermoplastic elastomers of polyvinyl chloride type are not mild for environment, those of diene type are insufficient in weathering resistance, and those of hydrogenated diene type, polyurethane type and polyamide type are expensive. Therefore, the polyolefin thermoplastic elastomers which are mild for environment, excellent in weathering resistance and can be supplied at low cost are now being mainly used. Especially, olefinic thermoplastic elastomers are mainly used which are produced by so-called dynamic crosslinking, namely, by crosslinking a rubber-like polymer comprising EPDM (ethylene-propylene-diene copolymer) and PP (polypropylene) with melt kneading them in the presence of a crosslinking agent in an extruder or the like. These olefin thermoplastic elastomers are being widely used for automobile parts, business and office machines, building materials and others as substitutes for flexible polyvinyl chloride, and they are expected much in the future.

These materials comprise a matrix component comprising PP (polypropylene) having fluidity and a rubber-like polymer component dispersed in the matrix so as to give thermoplasticity. Moreover, for providing rubber-like properties, the rubber-like polymer is partially or completely crosslinked.

The olefinic thermoplastic elastomers comprising such components have rubber-like properties. However, these olefinic thermoplastic elastomers have serious problems when they are widely used for automobile parts, business and office machines, building materials, and the like. That is, the flexible polyvinyl chloride has superior characteristics that it is hardly flawed, and it can be easily coated, printed and solvent bonded, while the olefinic thermoplastic elastomers are not satisfactory in these performances, and restricted in uses. Therefore, development of thermoplastic elastomers which are hardly flawed and relatively cheap has been expected.

SUMMARY OF THE INVENTION

Under the circumstances, the object of the present invention is to provide a thermoplastic elastomer which is excellent in abrasion resistance, namely, hardly flawed.

As a result of intensive research conducted by the inventors to attain the above object, it has been found that a thermoplastic elastomer excellent in abrasion resistance can be obtained when a thermoplastic resin containing a polystyrene resin is used as a matrix component and a rubber-like polymer obtained by partially or completely crosslinking an ethylene-α-olefin copolymer is used as a rubber component in the thermoplastic elastomer.

That is, the present invention relates to a thermoplastic elastomer composition which comprises (A) a thermoplastic resin containing a polystyrene resin, (B) a rubber-like polymer obtained by partially or completely crosslinking an ethylene-α-olefin copolymer, and (C) a compatibilizing agent, the content of the component (B) being 40–90 parts by weight and the content of the component (C) being 0.1–40 parts by weight based on 100 parts by weight of the components (A), (B) and (C) in total.

Furthermore, when content of the polystyrene resin in the thermoplastic resin is not less than 1% by weight and less than 40% by weight and, especially, when the thermoplastic resin comprises a polystyrene resin and a polyolefin resin, the resulting thermoplastic elastomer composition maintains excellent permanent compression set and impact resilience which are characteristics of olefinic thermoplastic elastomers and, besides, is excellent in abrasion resistance, and, on the other hand, when content of the polystyrene resin in the thermoplastic resin is not less than 40% by weight (including 100% by weight), the resulting thermoplastic elastomer composition is excellent not only in abrasion resistance, but also in coatability, solvent bonding properties, printability, and the like. Moreover, when content of the polystyrene resin in the thermoplastic resin is not less than 40% by weight (including 100% by weight), the resulting thermoplastic elastomer composition is superior in heat adhesion to hard polystyrene resins such as polystyrene, high-impact polystyrene and the like, and can be made into layered products having softened surface by insert molding, co-extrusion or the like.

Furthermore, a thermoplastic elastomer composition which is also excellent in heat resistance can be obtained by allowing a resin compatible with polystyrene to coexist in the polystyrene resin as a thermoplastic resin.

DETAILED DESCRIPTION OF THE INVENTION

The present invention will be explained in detail below. First, the components of the present invention will be explained in detail.

The polystyrene resin which is one of the component (A) in the thermoplastic elastomer composition of the present invention is fundamentally a homopolymer of a styrene monomer, namely, polystyrene, or a copolymer of a styrene monomer with other monomers. Examples of the other monomers used for the copolymer are styrene monomers such as α-methylstyrene, p-chlorostyrene, p-bromostyrene and 2,4,5-tribromostyrene, acrylate ester monomers such as methyl acrylate and butyl acrylate, methacrylate ester monomers such as methyl methacrylate and ethyl methacrylate, acid anhydride monomers such as maleic anhydride and itaconic anhydride, maleimide monomers such as maleimide, N-methylmaleimide and N-phenylmaleimide, and organic acid monomers such as acrylic acid and methacrylic acid. Among them, polystyrene is inexpensive and most preferred as the polystyrene resins. Moreover, molded products obtained from a thermoplastic elastomer composition which uses as the component (A) a polystyrene resin comprising a copolymer of styrene monomer with an acrylate ester monomer or a methacrylate ester monomer are excellent in weathering resistance.

Melt flow rate (MFR) of the polystyrene resin used is preferably in the range of 0.1–50 g/10 min (measured at 200° C. under a load of 5 kg), and, more preferably, in the range of 0.5–30 g/10 min. If the melt flow rate is less than 0.1 g/10 min, the resulting thermoplastic elastomer composition is low in fluidity. If it exceeds 50 g/10 min, molded products obtained from the resulting thermoplastic elastomer composition are low in mechanical strength.

The component (A) is a thermoplastic resin containing a polystyrene resin as an essential component. Content of the polystyrene resin in the thermoplastic resin is 1–100% by weight, and preferably 5–100% by weight. If the content of the styrene resin in the thermoplastic resin is less than 1% by weight, the desired improvement in abrasion resistance is low.

Here, when content of the polystyrene resin in the thermoplastic resin is not less than 1% by weight and less than 40% by weight and, especially, when the thermoplastic resin comprises a polystyrene resin and a polyolefin resin, the resulting thermoplastic elastomer composition maintains excellent characteristics of olefinic thermoplastic elastomers and, besides, is excellent in abrasion resistance.

When the thermoplastic resin consists of a polystyrene resin (when content of the polystyrene resin is 100% by weight), or when content of the polystyrene resin in the thermoplastic resin is not less than 40% by weight and less than 100% by weight, namely, when content of the polystyrene resin is not less than 40% by weight, the resulting thermoplastic elastomer composition is excellent in abrasion resistance, coatability, solvent bonding properties, printability and the like and, besides, can be laminated with a hard polystyrene resin.

The thermoplastic resin which is the component (A) in the thermoplastic elastomer composition of the present invention may comprise only a polystyrene resin or may comprise a polystyrene resin and a polyolefin resin. The polyolefin resin used in this case includes roughly a polyethylene resin, a polypropylene resin or a mixture of a polyethylene resin and a polypropylene resin.

Examples of the polyethylene resin are a high-density polyethylene (HDPE), a low-density polyethylene (LDPE), a straight chain low-density polyethylene (LLDPE), a copolymer of an acrylic vinyl monomer and ethylene (EEA, EMMA, or the like) and a copolymer of vinyl acetate monomer and ethylene (EVA). Of these resins, high-density polyethylene (HDPE), low-density polyethylene (LDPE) and straight chain low-density polyethylene (LLDPE) are especially preferred because these are inexpensive. These polyethylene resins may be used each alone or in combination of two or more.

In the case of using high-density polyethylene (HDPE), it is preferred that density thereof is generally in the range of 0.930–0.970 g/cm$^2$, and melt flow rate (MFR) thereof is in the range of 0.05–100 g/10 min (measured at 190° C. under a load of 2.16 kg). In the case of using low-density polyethylene (HDPE) or straight chain low-density polyethylene (LLDPE), it is preferred that density thereof is generally in the range of 0.900–0.930 g/cm$^2$, and melt flow rate (MFR) thereof is in the range of 0.05–100 g/10 min (measured at 190° C. under a load of 2.16 kg). If the melt flow rate exceeds 100 g/10 min, mechanical strength and heat resistance of molded products obtained from the thermoplastic elastomer composition of the present invention are insufficient, and if it is less than 0.05 g/10 min, fluidity of the thermoplastic elastomer composition of the present invention is inferior at the time of being molded, and molding workability of the composition is deteriorated.

As the polypropylene resin, mention may be made of, for example, polypropylene which is a homopolymer of propylene and copolymer resins of propylene with other α-olefins such as ethylene, butene-1, pentene-1 and hexene-1. Melt flow rate (MFR) of the polypropylene resin is preferably in the range of 0.1–100 g/10 min (measured at 230° C. under a load of 2.16 kg). If the melt flow rate exceeds 100 g/10 min, mechanical strength and heat resistance of molded products obtained from the thermoplastic elastomer composition of the present invention are insufficient, and if it is less than 0.1 g/10 min, fluidity of the thermoplastic elastomer composition of the present invention is inferior at the time of being molded, and molding workability of the composition is deteriorated.

The polyolefin resin used as the component (A) in the thermoplastic elastomer composition of the present invention comprises a polyethylene resin and/or a polypropylene resin as mentioned above, and polypropylene resin is higher in heat resistance than polyethylene resin and is more preferred. However, polypropylene which is a homopolymer of propylene generally readily undergoes oxidative destruction and tends to deteriorate in mechanical strength due to decrease of molecular weight in long-term use. On the other hand, a polyethylene resin generally does not undergo oxidative destruction, but is crosslinked and the mechanical strength tends to be maintained or improved. Therefore, in the case of using polypropylene resin, when the composition is used especially for the use requiring endurance, it is preferred to use polypropylene and a polyethylene resin in combination or to use random or block copolymer of propylene with an ethylene monomer.

The thermoplastic resin which is the component (A) of the thermoplastic elastomer of the present invention may contain in addition to or in place of the polyolefin resin a thermoplastic resin such as of polyphenylene ether type, polyvinyl chloride type, polyamide type, polyester type polyphenylene sulfide type, polycarbonate type or polymethacrylate type. Among them, the polyphenylene ether resin is most preferred since it is satisfactory in compatibility with polystyrene resin and can give heat resistance. When such thermoplastic resin is used, it is preferred to add optionally a new compatibilizing agent which compatibilizes this resin with polystyrene resin and ethylene-α-olefin copolymer.

JP-A-9-25370 (U.S. Pat. No. 5,574,105) discloses a thermoplastic elastomer comprising a blend of an olefinic dynamically crosslinked thermoplastic elastomer, an engineering resin, and a compatibilizing agent. This thermoplastic elastomer is aimed at being improved in heat resistance, tensile characteristics and fluidity characteristics by containing an engineering resin as a component. In examples of the patent publication, a polyamide (nylon-6) is disclosed as the engineering resin. However, polyamide resin per se is low in hardness. Therefore, even when such engineering resin is added to olefinic dynamically crosslinked thermoplastic elastomer, flaw resistance, namely, abrasion resistance which is one of the characteristics of the thermoplastic elastomer composition of the present invention cannot be improved. A polystyrene resin, particularly, polystyrene is a resin which is very high in hardness (very hard). The abrasion resistance is improved because of the high hardness. The present invention provides a composition which also possesses this feature, while the above patent publication makes no mention of these points.

Next, the rubber-like polymer which is the component (B) will be explained.

This rubber-like polymer is basically a partially or completely crosslinked copolymer of ethylene and an α-olefin. Here, a hydrogenated conjugated diene polymer which consequentially becomes a copolymer of ethylene and an α-olefin is also included in the ethylene-α-olefin copolymer.

The copolymer of ethylene and an α-olefin, namely, the ethylene-α-olefin copolymer will be explained in detail.

Preferred are ethylene-α-olefin copolymers mainly composed of ethylene and an α-olefin of 3–20 carbon atoms. The α-olefins of 3–20 carbon atoms include propylene, butene-1, pentene-1, hexene-1, 4-methylpentene-1, heptene-1, octene-1, nonene-1, decene-1, undecene-1, dodecene-1, and the like. These α-olefins may be used each alone or in combination of two or more. Furthermore, they may contain a copolymer component as a third component. As the copolymer component of the third component, mention may be made of, for example, conjugated dienes such as 1,3-butadiene and isoprene, and non-conjugated dienes such as dicyclopentadiene, 1,4-hexadiene, cyclooctadiene, methylenenorbornene and ethylidenenorbornene. One typical example thereof is EPDM (ethylene-propylene-diene copolymer).

As mentioned above, the ethylene-α-olefin copolymer which is the component (B) of the present invention also includes ethylene-α-olefin copolymer in which a conjugated diene or non-conjugated diene is copolymerized as a third component. However, ethylene-α-olefin copolymers containing no conjugated diene or non-conjugated diene are superior in weathering resistance and are more preferred. Among them, ethylene-octene-1 copolymer elastomer is easy in crosslinking and is most preferred.

The ethylene-α-olefin copolymer used as the component (B) are preferably one which is produced using metallocene catalysts.

The metallocene catalysts generally comprise a promoter and a cyclopentadienyl derivative of a metal of Group IV, such as titanium or zirconium, and they are not only high in activity as polymerization catalysts, but also, as compared with conventional Ziegler catalysts, give polymers which are narrower in molecular weight distribution and which have a more uniform distribution of α-olefin of 3–20 carbon atoms as a comonomer in the copolymer. Therefore, the ethylene-α-olefin copolymers produced using metallocene catalysts are more uniform in crosslinking and show superior rubber elasticity.

The ethylene-α-olefin copolymer used as the component (B) of the present invention has a copolymerization ratio of α-olefin of preferably 1–60% by weight, more preferably 10–50% by weight, most preferably 20–45% by weight. If the copolymerization ratio of the α-olefin exceeds 60% by weight, reduction of tensile strength of the molded products obtained by molding the thermoplastic elastomer composition of the present invention sometimes becomes great. If it is less than 1% by weight, the molded products obtained by molding the thermoplastic elastomer composition of the present invention sometimes do not show the effect as an elastomer.

Density of the ethylene-α-olefin copolymer is preferably 0.800–0.900 g/cm$^3$, more preferably 0.850–0.900 g/cm$^3$. By using a rubber-like polymer comprising the ethylene-α-olefin copolymer having a density in the above range, the thermoplastic elastomer superior in rubber elasticity can be obtained.

The ethylene-α-olefin copolymer used as the component (B) of the present invention preferably has a long chain branching. Due to the presence of the long chain branching, it becomes possible to make the density smaller as compared with the proportion (% by weight) of the copolymerized α-olefin without causing deterioration of the mechanical strength, and thus, rubber-like polymer of low density, low hardness and high strength can be obtained. Therefore, in the rubber-like polymer comprising the ethylene-α-olefin copolymer which is the component (B) of the present invention, the carbon number of the α-olefin in the copolymer is preferably 4–20, more preferably 6–20. Among them, ethylene-octene-1 copolymer in which the carbon number of the α-olefin is 8 is easy in crosslinking, and can provide a thermoplastic elastomer excellent in rubber elasticity, and, thus, this is most preferred.

Furthermore, the ethylene-α-olefin copolymer used as the component (B) of the present invention preferably has a melting point peak of DSC at room temperature or higher. When it has the melting point peak, it is stable in the form at a temperature in the range of not higher than the melting point, excellent in handleability and less in tack.

Moreover, melt flow rate of the ethylene-α-olefin copolymer used as the component (B) of the present invention is preferably 0.01–100 g/10 min (measured at 190° C. under a load of 2.16 kg), more preferably 0.2–20 g/10 min. If the melt flow rate exceeds 100 g/10 min or less than 0.01 g/10 min, when the rubber-like polymer is subjected to dynamic crosslinking, the dispersion state of the rubber-like polymer is inferior, and strength, rubber elasticity or the like as thermoplastic elastomer is deteriorated.

A plurality of the rubber-like polymers which are the component (B) of the composition of the present invention may be used in admixture, and, in this case, the workability can be further improved.

It is necessary that the rubber-like polymer which is the component (B) comprises an ethylene-α-olefin copolymer which is partially or completely crosslinked. When comparison is made on the molded products obtained by molding the thermoplastic elastomer composition of the present invention with or without carrying out the crosslinking, the products obtained with carrying out the crosslinking are markedly improved in heat resistance and rubber elasticity such as permanent compression set and impact resilience. If proportion of the crosslinked rubber-like polymer (rubber-like polymer insoluble in solvents) in the whole rubber-like polymer in the thermoplastic elastomer composition of the present invention is defined by crosslinking degree, the crosslinking degree is preferably not less than 30%, more preferably not less than 50%.

JP-A-11-293046 and JP-A-11-293072 disclose dynamically crosslinked elastomers containing an aromatic vinyl-olefin random copolymer as a rubber-like polymer, and a styrene resin and a crystalline olefin resin or a styrene resin as a fluid component. The rubber-like polymer in the present invention comprises an ethylene-α-olefin copolymer, and when comparison is made on using the rubber-like polymer comprising the ethylene-α-olefin copolymer of the present invention and the rubber-like polymer comprising the aromatic vinyl-olefin random copolymer disclosed in the patent publications, the ethylene-α-olefin copolymer is much superior in performances as elastomer, namely, rubber elasticity. The reason is as explained below.

That is, content of styrene in the styrene-ethylene random copolymer used in the above patent publications is 11.5–37.1 mol % for obtaining rubber-like state. In the case of carrying out dynamic crosslinking using this rubber-like polymer, the crosslinking reaction takes place in the ethylene component, but since amount of this ethylene component is small, the crosslinking efficiency is much inferior, and, hence, it is difficult to make an elastomer excellent in rubber elasticity. Furthermore, glass transition temperature (Tg) of the styrene-ethylene random copolymer in the above range is at about room temperature, and rubber elasticity at low temperatures is inferior. On the other hand, the ethylene-α-olefin copolymer of the present invention is easy in crosslinking, and has a glass transition temperature (Tg) at not higher than −50° C. and is excellent in low-temperature characteristics.

Next, the compatibilizing agent which is the component (C) in the thermoplastic elastomer composition of the present invention will be explained.

The polystyrene resin which is essential as the component (A) and the rubber-like polymer comprising the ethylene-α-olefin copolymer which is the component (B) in the composition of the present invention generally lack affinity, namely, compatibility with each other. Since the molded products obtained by molding the thermoplastic elastomer composition of the present invention have the structure of the rubber-like polymer being partially or completely crosslinked, the products generally have a morphology of sea-islands structure comprising the sea phase of the thermoplastic resin of the component (A) and the islands phase of the rubber-like polymer of the component (B) in the form of dispersed particles of generally 0.2–2.0 µm. Since these phases have no affinity with each other, they are low in interfacial strength. Therefore, if the composition comprises only the polystyrene resin as the component (A) and the rubber-like polymer comprising the ethylene-α-olefin copolymer as the component (B), the molded products obtained by molding the composition are low in strength. Furthermore, the polystyrene resin cannot be uniformly admixed with the polyolefin resin used in combination with the polystyrene resin. Therefore, phase separation occurs between these two resins, and the molded products obtained by molding the composition are low in strength. Thus, it is necessary to impart an interfacial bonding function between the polystyrene resin as the component (A) and the rubber-like polymer comprising the ethylene-α-olefin copolymer as the component (B), and it is also necessary to impart affinity between the polyolefin resin and the polystyrene resin in the case of allowing the poly-olefin resin to exist with the polystyrene resin as the component (A). For this purpose, the compatibilizing agent which is the component (C) is indispensable to the thermoplastic elastomer composition of the present invention.

The compatibilizing agent of the component (C) has no special limitation as far as it can compatibilize the polystyrene resin as the component (A) and the rubber-like polymer comprising the ethylene-α-olefin copolymer as the component (B), and, besdies, the polystyrene resin and the polyolefin resin which are both the component (A). In this case, since the polyolefin resin and the rubber-like polymer comprising the ethylene-α-olefin copolymer are both the same polyolefin materials, usually one kind of the compatibilizing agent exhibits its function. However, use of one kind of compatibilizing agent can not necessarily exhibit its function. In this case, there may be used in combination a compatibilizing agent which compatibilizes the polystyrene resin as the component (A) and the rubber-like polymer comprising the ethylene-α-olefin copolymer as the component (B) and a compatibilizing agent which compatibilizes the polystyrene resin and the polyolefin resin and others which are all the component (A).

The compatibilizing agent which is the component (C) includes, for example, those which have both the component (X) compatible with polystyrene and the component (Y) compatible with polyolefin. For example, mention may be made of block copolymers of X and Y (X–Y type block copolymers), graft copolymers of X and Y (copolymers in which X is grafted on Y, copolymers in which Y is grafted on X), and random copolymers of X and Y (copolymers in which the monomer constituting X is randomly introduced into Y, copolymers in which the monomer constituting Y is randomly introduced into X). Furthermore, examples of the component (X) compatible with polystyrene are homopolymer of styrene and copolymers of styrene with other monomers (preferably polystyrene). Examples of the component (Y) compatible with polyolefin are polyethylene, polypropylene, ethylene-α-olefin copolymers mainly comprising ethylene and α-olefins of 3–20 carbon atoms, hydrogenated polybutadienes, and hydrogenated polyisoprenes. The component (Y) compatible with polyolefin may comprise one polymer or two or more polymers in combination.

Specific examples of them are styrene-grafted polypropylene, styrene-butadiene block or random copolymers, styrene-isoprene block or random copolymers, hydrogenated styrene-butadiene block or random copolymers, hydrogenated styrene-isoprene block or random copolymers, and ethylene-styrene random copolymers. Among them, hydrogenated styrene-butadiene block or random copolymers or hydrogenated styrene-isoprene block copolymers per se act as compatibilizing agents, and, simultaneously, show rubber-like characteristics and are superior in weathering resistance and heat resistance, and, thus, these are most preferred.

The compatibilizing agent which is the component (C) in the thermoplastic elastomer composition of the present invention may be used singly or in combination of a plurality of them.

Amount of the component (B) in the thermoplastic elastomer composition of the present invention is 40–90 parts by weight, preferably 45–80 parts by weight, more preferably 50–70 parts by weight based on 100 parts by weight of the components (A), (B) and (C) in total. Amount of the component (C) is 0.1–40 parts by weight, preferably 1–20 parts by weight, more preferably 2–10 parts by weight based on 100 parts by weight of the components (A), (B) and (C) in total. If the amount of the component (B) is less than 40 parts by weight, the composition of the present invention lacks rubber elasticity and is inferior in performance as an elastomer. If it exceeds 90 parts by weight, amount of the thermoplastic resin as the component (A) which imparts fluidity becomes small and the composition is inferior in fluidity and can hardly be subjected to molding. If the amount of the component (C) is less than 0.1 part by weight, interfacial strength between the polystyrene resin as the component (A) and the partially or completely crosslinked ethylene-α-olefin copolymer as the component (B) is low, and the molded products obtained by molding the thermoplastic elastomer composition of the present invention are low in strength. Furthermore, when the component (A) is a thermoplastic resin comprising polystyrene resin and polyolefin resin, if the amount of the component (C) is less than 0.1 part by weight, the polystyrene resin and the polyolefin resin cause phase separation to result in reduction of strength of the molded products obtained by molding the thermoplastic elastomer. Use of the component (C) in an amount of more than 40 parts by weight is economically disadvantageous because the compatibilizing agent is generally expensive.

The thermoplastic elastomer composition of the present invention can contain various additives. Examples of the additives are softening agents, glass fibers, organic or inorganic fibers such as polyacrylonitrile fibers and carbon fibers, metallic fibers such as copper and brass, whiskers such as potassium titanate, magnesium oxysulfate and aluminum borate, powdery inorganic fillers such as calcium carbonate, magnesium carbonate, silica, carbon black, titanium oxide, clay, mica, talc, magnesium hydroxide and aluminum hydroxide, plasticizers such as polyethylene glycol and dioctyl phthalate (DOP), and furthermore, organic and inorganic pigments, heat stabilizers, antioxidants, ultraviolet absorbers, light stabilizers, flame retardants, silicone oils, anti-blocking agents, foaming agents, antistatic agents and anti-fungus agents.

Of these additives, the softening agent has the effect to reduce hardness of the molded products obtained by molding the thermoplastic elastomer composition of the present invention and is a very effective component. The softening agent is especially preferably a process oil such as paraffinic or naphthenic type. If the softening agent is added, the amount thereof is 0.5–200 parts by weight, preferably 1–100 parts by weight, more preferably 1–50 parts by weight, most preferably 1–30 parts by weight based on 100 parts by weight of the composition of the present invention. If the amount of the softening agent is less than 0.5 part by weight, when a flexibilizer is added, the effect thereof is low. If the amount exceeds 200 parts by weight, bleeding out of the softening agent becomes conspicuous and this is not preferred.

Next, method for producing the thermoplastic elastomer composition of the present invention will be explained. As preferred methods for producing the thermoplastic elastomer composition of the present invention, the following methods can be mentioned.

According to the first method, the polystyrene resin or a mixture of the polystyrene resin and other thermoplastic resin (preferably a polyolefin resin) which is the component (A), the rubber-like polymer comprising the ethylene-α-olefin copolymer which is a starting material for the component (B), the compatibilizing agent which is the component (C), and a radical initiator and a crosslinking aid used for partially or completely crosslinking the ethylene-α-olefin copolymer are heat treated by a twin-screw extruder, a Banbury mixer or the like to partially or completely dynamically crosslink the rubber-like polymer. In this case, when the compatibilizing agent used is crosslinked with the radical initiator and the crosslinking aid, the crosslinking is carried out without adding the compatibilizing agent, and the compatibilizing agent is additionally added after completion of the crosslinking of the rubber-like polymer, or the resulting thermoplastic elastomer and the compatibilizing agent are melt kneaded by a twin-screw extruder, a Banbury mixer or the like to prepare the thermoplastic elastomer composition of the present invention.

According to the second method, when the thermoplastic resin of the component (A) comprises polystyrene resin and polyolefin resin, the polyolefin resin and the rubber-like polymer comprising the ethylene-α-olefin copolymer which is a starting material for the component (B), a crosslinking agent and a crosslinking aid are first heat treated by a twin-screw extruder, a Banbury mixer or the like to partially or completely crosslink the rubber-like polymer in the presence of the crosslinking agent comprising a radical initiator, a crosslinking aid and the like, and then the resulting olefinic thermoplastic elastomer and the polystyrene resin are melt kneaded by a twin-screw extruder, a Banbury mixer or the like, or the resulting olefinic thermoplastic elastomer pellets and the polystyrene resin pellets are pellet-blended. In this case, if the compatibilizing agent which is the component (C) does not cause crosslinking reaction with the radical initiator and the crosslinking aid, the compatibilizing agent may be allowed to coexist with the polyolefin resin and the rubber-like polymer at the time of preparation of the olefinic thermoplastic elastomer, but generally the compatibilizing agent irrespective of causing the crosslinking reaction or not is preferably added at the time of melt kneading or pellet blending the olefinic thermoplastic elastomer and the polystyrene resin.

When a polyethylene resin alone is used as the polyolefin resin used in producing the olefinic thermoplastic elastomer, the matrix is also crosslinked and the resulting polyolefinic thermoplastic elastomer sometimes does not show thermoplasticity. Therefore, the polyolefin resin is preferably mainly composed of a polypropylene resin which is not crosslinked or is preferably a mixture of polypropylene resin and polyethylene resin.

According to the third method, the olefinic thermoplastic elastomer obtained by the second method is impregnated with a styrene monomer and the styrene is polymerized in the presence of a radical initiator. In the case of using a compatibilizing agent which is not crosslinked with radical initiator and crosslinking aid in the third method, the compatibilizing agent may be added at the time of producing the polyolefinic thermoplastic elastomer or the compatibilizing agent may be added after polymerization of styrene, followed by melt kneading to obtain the composition of the present invention.

The methods for producing the thermoplastic elastomer of the present invention are not limited to those mentioned above, but the first method is most preferred because the thermoplastic elastomer of the present invention can be produced by one step.

When the above production methods are employed, the radical initiators which are crosslinking agents used in the above first and second methods and the polymerization initiators used in the third method include radical initiators such as organic peroxides and organic azo compounds. Specific examples of them are peroxy ketals such as 1,1-bis(t-butylperoxy)-3,3,5-trimethylcyclohexane, 1,1-bis(t-hexylperoxy)-3,3,5-trimethylcyclohexane, 1,1-bis(t-hexylperoxy)-cyclohexane, 1,1-bis(t-butylperoxy)cyclododecane, 1,1-bis(t-butylperoxy)cyclohexane, 2,2-bis(t-butylperoxy)octane, n-butyl-4,4-bis(t-butylperoxy)butane and n-butyl-4,4-bis(t-butylperoxy)valerate; dialkyl peroxides such as di-t-butyl peroxide, dicumyl peroxide, t-butylcumyl peroxide, α, α'-bis (t-butylperoxy-m-isopropyl)benzene, α, α'-bis(t-butylperoxy)diisopropylbenzene, 2,5-dimethyl-2,5-bis(t-butylperoxy)hexane and 2,5-dimethyl-2,5-bis(t-butylperoxy)hexyne-3; diacyl peroxides such as acetyl peroxide, isobutyryl peroxide, octanoyl peroxide, decanoyl peroxide, lauroyl peroxide, 3,5,5-trimethylhexanoyl peroxide, benzoyl peroxide, 2,4-dichlorobenzoyl peroxide and m-tolyoyl peroxide; peroxy esters such as t-butylperoxy acetate, t-butylperoxy isobutyrate, t-butylperoxy-2-ethyl hexanoate, t-butylperoxy laurate, t-butylperoxy benzoate, di-t-butylperoxy isophthalate, 2,5-dimethyl-2,5-di(benzoylperoxy)hexane, t-butylperoxymaleic acid, t-butylperoxyisopropyl carbonate and cumylperoxy octate; and hydroperoxides such as t-butyl hydroperoxide, cumene hydroperoxide, diisopropylbenzene hydroperoxide, 2,5-dimethylhexane-2,5-dihydroperoxide and 1,1,3,3-tetramethylbutyl peroxide.

Of these compounds, preferred are 1,1-bis(t-butylperoxy)-3,3,5-trimethylcyclohexane, di-t-butyl peroxide, dicumyl peroxide, 2,5-dimethyl-2,5-bis(t-butylperoxy)hexane and 2,5-dimethyl-2,5-bis(t-butylperoxy)hexyne-3.

When the rubber-like polymer comprising the ethylene-α-olefin copolymer is crosslinked by the above first or second method, these radical initiators are used in an amount of 0.02–3 parts by weight, preferably 0.05–1 part by weight based on 100 parts by weight of the rubber-like polymer. The level of crosslinking depends mainly on this amount. If the amount is less than 0.02 part by weight, the crosslinking tends to be insufficient and even if it exceeds 3 parts by weight, the crosslinking rate is no longer greatly improved and this is not preferred.

As the crosslinking aids, there may be preferably used divinylbenzene, triallyl isocyanurate, triallyl cyanurate, diacetonediacrylamide, polyethylene glycol diacrylate, polyethylene glycol dimethacrylate, trimethylolpropane trimethacrylate, trimethylolpropane triacrylate, ethylene glycol dimethacrylate, triethylene glycol dimethacrylate, diethylene glycol dimethacrylate, diisopropenylbenzene, p-quinone dioxime, p,p'-dibenzoylquinone dioxime, phenylmaleimide, allyl methacrylate, N,N'-m-phenylenebismaleimide, diallyl phthalate, tetraallyloxyethane, 1,2-polybutadiene, and the like. These crosslinking aids may be used in combination of two or more.

These crosslinking aids are used in an amount of 0.1–5 parts by weight, preferably 0.5–2 parts by weight based on 100 parts by weight of the rubber-like polymer comprising the ethylene-α-olefin copolymer. If the amount is less than 0.1 part by weight, the crosslinking rate is low and not preferred. Even if it exceeds 5 parts by weight, the crosslinking rate is no longer greatly improved, and the excess crosslinking aids remain, which is not preferred.

For performing the crosslinking, it is preferred to use the radical initiator and the crosslinking aid as mentioned above, but phenolic resin, bismaleimide or the like can also be used as the crosslinking agent.

As equipment for partially or completely crosslinking the ethylene-α-olefin copolymer, a Banbury mixer, a kneader, a single-screw extruder, a twin-screw extruder, and the like can be used. The twin-screw extruder is especially preferred for efficiently attaining the crosslinking. The twin-screw extruder can disperse uniformly and finely the rubber-like polymer and the thermoplastic resin and, besides, can satisfactorily carry out the crosslinking reaction with crosslinking agent, and, hence, this extruder is suitable for continuous production of crosslinked products.

The elastomer composition of the present invention can be produced specifically through the following processing steps. That is, the rubber-like polymer comprising the ethylene-α-olefin copolymer and the polystyrene resin or a mixture of the polystyrene resin and a thermoplastic resin other than the polystyrene resin (preferably a polyolefin resin) are introduced into a hopper of an extruder. The crosslinking agents such as the radical initiator and the crosslinking aid may be added initially together with the rubber-like polymer and the thermoplastic resin or may be added at the intermediate portion of the extruder. In the case of adding an oil as the softening agent, this may be added at the intermediate portion of the extruder or may be divided and separately added initially and at the intermediate portion. A part of the rubber-like polymer and the thermoplastic resin may be added at the intermediate portion of the extruder. In heat melting and kneading in the extruder, the rubber-like polymer reacts with the radical initiator and the crosslinking aid, and, if necessary, an oil or the like is further added, followed by carrying out melt kneading, thereby performing sufficiently the crosslinking reaction and the kneading dispersion, and then the reaction product is taken out from the extruder. The product is pelletized to obtain the thermoplastic elastomer composition in the form of pellets of the present invention.

The thus obtained thermoplastic elastomer composition of the present invention can be made to various molded products by optional molding methods, which are preferably injection molding, extrusion molding, compression molding, blow molding, calender molding, expansion molding, and the like.

The thermoplastic elastomer of the present invention comprising as a matrix a thermoplastic resin containing a polystyrene resin as an essential component and a partially or completely crosslinked ethylene-α-olefin copolymer as a rubber component is excellent in abrasion resistance.

Furthermore, when content of the polystyrene resin in the thermoplastic resin which is a matrix is less than 40% by weight and especially when the thermoplastic resin comprises a polystyrene resin and a polyolefin resin, a thermoplastic elastomer can be obtained which maintains the excellent characteristics of olefinic thermoplastic elastomers and which is excellent in abrasion resistance.

Furthermore, when the content of the polystyrene resin exceeds 40% by weight, a thermoplastic elastomer can be obtained which is excellent in abrasion resistance, and besides in coatability, solvent bonding properties and printability and, furthermore, can be laminated with hard polystyrene resins.

Therefore, the thermoplastic elastomer composition of the present invention can be employed for various uses, for example, packaging materials, housing and building materials, automobile materials, and business and office devices such as for office automation, tools, toys, daily necessaries and the like, and, thus, is industrially very valuable.

Moreover, the thermoplastic elastomer composition of the present invention in which the thermoplastic resin mainly composed of a polystyrene resin is used as a matrix can be heat bonded to styrene resins such as polystyrene (PS) or high-impact polystyrene resins (HIPS). Therefore, there can be obtained a layered product comprising a substrate comprising polystyrene (PS) or a high-impact polystyrene (HIPS) and the thermoplastic elastomer composition as a skin material, namely, a high strength material having a softened surface. This layered product can also be utilized for building materials, for example, handrails of stairs, non-skid mats for bathroom, and deck board.

DESCRIPTION OF PREFERRED EMBODIMENTS

The present invention will be explained in more detail by the following examples and comparative examples, which are not intended for purpose of limitation. Test methods employed for evaluation of various properties, raw materials and method for production of thermoplastic elastomer used in the examples and the comparative examples are shown below.

1. Test Methods (1) Hardness:

Four sheets each having a thickness of 2 mm were stacked, and the evaluation was conducted thereon in accordance with ASTM D2240 by A type in an atmosphere of 23° C.

(2) Tensile Break Strength [MPa]:

This was evaluated in accordance with JIS K6251 at 23° C.

(3) Tensile Break Elongation [%]:

This was evaluated in accordance with JIS K6251 at 23° C.

(4) Compression Set (C-Set) [%]:

This was evaluated in accordance with JIS K6301 at 70° C.×22 hours.

(5) Abrasion Resistance:

This was evaluated using Color fastness robbing tester AB301 (mfd. by Tester Sangyo Co., Ltd.). Evaluation conditions were as follows. Results of the evaluation are shown by abrasion wear (g) after subjecting to reciprocation of 2000 times.

Temperature condition: Atmosphere of 23° C.
Stroke: 120 mm.
Frequency: 1 reciprocation/2 seconds.
Load: 500 g.
Abrasive material: White cotton cloth No.3 (Kanakin No. 3) comprising 100% of cotton fabric (in accordance with JIS L0803). This was folded in three and set in the tester.
Contact area: 1 cm$^2$.

(6) Adhesion:

The thermoplastic elastomer composition of the present invention was press molded to make a sheet of 0.2 mm in thickness. This sheet was applied to a mold of an injection molding machine (Toshiba IS45PNV) and a commercially available high-impact polystyrene (HIPS) was injection molded in a thickness of 2 mm. Adhesion between the thermoplastic elastomer and the HIPS in the resulting layered product was evaluated. Evaluation criteria are as follows.

⊚: No peeling occurred between them (causing rupture of the substrate).

○: They were peeled by application of strong force.

Δ: They adhered to each other, but were relatively easily peeled.

X: They did not adhere to each other at all.

(7) Coatability:

A commercially available urethane paint (solvent type) was brushed on the thermoplastic elastomer sheet of the present invention and dried. Evaluation was conducted on whether the paint peeled off from the substrate or not when the elastomer sheet was bent. Evaluation criteria are as follows.

○: The paint did not peeled off.

Δ: The paint did not peeled off, but partially peeled when the sheet was bent many times.

X: The paint peeled off.

(8) Crosslinking Degree:

0.5 Gram of the crosslinked thermoplastic elastomer composition was refluxed in 200 ml of xylene for 4 hours. The solution was filtered with a quantity measuring filter paper, and the residue on the filter paper was vacuum dried and the weight of the residue was measured. The crosslinking degree was calculated as a ratio (%) of the weight of the residue to the weight of the rubber-like polymer in the crosslinked thermoplastic elastomer composition.

2. Starting Materials (1) Rubber-Like Polymers (Ethylene-α-Olefin Copolymers)

(a) Ethylene-Octene-1 Copolymer:

This was prepared by the process using metallocene catalysts as disclosed in JP-A-3-163088. The compositional ratio of ethylene/octene-1 of the copolymer was 72/28 (weight ratio). (The resulting copolymer was referred to as "TPE-1".)

(b) Ethylene-Propylene-Dicyclopentadiene Copolymer-1:

This was prepared by the process using metallocene catalysts as disclosed in JP-A-3-163088. The compositional ratio of ethylene/propylene/dicyclopentadiene of the copolymer was 50/41/9 (weight ratio). (The resulting copolymer was referred to as "TPE-2".)

(c) Ethylene-Propylene-Dicyclopentadiene Copolymer-2:

This was prepared by a general process using a Ziegler catalyst. The compositional ratio of ethylene/propylene/dicyclopentadiene of the copolymer was 47.5/43/9.5 (weight ratio). (The resulting copolymer was referred to as "TPE-3".)

(d) Hydrogenated Polybutadiene:

This was prepared by the process disclosed in JP-A-60-220147. Amount of the 1,2-vinyl bond in the polybutadiene portion before hydrogenation was 30% by weight, and hydrogenation rate was 99%. (The resulting polybutadiene was referred to as "TPE-4".)

(2) Polystyrene Resins (a) Polystyrene (trade name: GP685) manufactured by Asahi Kasei K. K. (This was referred to as "PS".)

(b) Styrene/methyl methacrylate copolymer (methyl methacrylate 20% by weight) (product on experimental basis) manufactured by Asahi Kasei K. K. (This was referred to as "MS".)

(c) Styrene/n-butyl acrylate copolymer (n-butyl acrylate 5% by weight) (product on experimental basis) manufactured by Asahi Kasei K. K. (This was referred to as "BS".)

(3) Olefin Resins (a) Polypropylene

Isotactic homopolypropylene (trade name: PM900A) manufactured by Japan Polyolefin Co., Ltd. (This was referred to as "PP".)

(b) Ethylene-Propylene Copolymer Resin

Block E-PP Resin [ethylene/propylene=6/94 (weight ratio)] (trade name: PM970A) manufactured by Japan Polyolefin Co., Ltd. (This was referred to as "EP".)

(c) High-Density Polyethylene

SUNTEC HD (trade name: B470) manufactured by Asahi Kasei K. K. (This was referred to as "HDPE".)

(4) Polyphenylene Ether Resin

Polyphenylene ether powder, ηsp/C=0.5 (chloroform) manufactured by Asahi Kasei K. K. (This was referred to as "PPE".)

(5) Polyamide Resin

Nylon-6 (trade name: 1007J) manufactured by Mitsubishi Engineering Plastic Co., Ltd. (This was referred to as "PA6".)

(6) Radical Initiator 2,5-Dimethyl-2,5-bis(t-butylperoxy)hexane (trade name: PERHEXA 25B) manufactured by Nippon Oil & Fats Co., Ltd. (This was referred to as "POX".)

(7) Crosslinking Aids (a) Divinylbenzene manufactured by Wako Junyaku Co., Ltd. (This was referred to as "DVB".)

(b) Triallyl isocyanurate manufactured by Nihon Kasei Co., Ltd. (This was referred to as "TAIC".)

(8) Softening Agent (Paraffin Oil)

Diana Process Oil (trade name: PW-380) manufactured by Idemitsu Kosan Co., Ltd.

(9) Compatibilizing Agents (a) Hydrogenated Styrene-Butadiene Block Copolymer

TUFTEC (styrene content: 60%) manufactured by Asahi Kasei K. K. (This was referred to as "HTR".)

(b) Styrene-Grafted Polypropylene

MODIPER (styrene content: 30%) (trade name: A3100) manufactured by Nippon Oil & Fats Co., Ltd. (This was referred to as "SGP".)

(c) Ethylene-Styrene Random Copolymer

This was prepared by the process disclosed in JP-A-7-70223. The compositional ratio of ethylene/styrene of the copolymer was 30/70 (weight ratio). (The resulting copolymer was referred to as "ESP".)
(d) Maleic Anhydride-Modified Polypropylene
ADOMER (trade name: QF305) manufactured by Mitsui Chemical Co., Ltd. (This was referred to as "M-PP".)
3. Method for the Production of Olefinic Thermoplastic Elastomer:
(1) TPV-1
A twin screw extruder (40 mmϕ, L/D=47) having a pouring port at the center of barrel was used as an extruder. As the screw, a double-thread screw having kneading parts before and after the pouring port was used. TPE-1/PP/POX/DVB=70.0/30.0/0.5/1.0 (weight ratio) were mixed and melt-extruded at a cylinder temperature of 22° C. In the melt-extrusion, 42 parts by weight of a softening agent (PW-380) based on 100 parts by weight of the total amount of TPE-1 and PP was poured from the pouring port provided at the center of the extruder. Crosslinking degree of the resulting crosslinked thermoplastic elastomer was 85%. Composition of this TPV-1 was TPE-1/PP/softening agent=49.3/21.1/29.6 (weight ratio).
(2) TPV-2
A crosslinked thermoplastic elastomer was obtained in the same manner as in the above (1), except that the ratio of TPE-1/PP/POX/DVB was changed to 52.0/48.0/0.35/0.70 (weight ratio) and the amount of the softening agent poured was changed to 28.8 parts by weight. Crosslinking degree of the resulting crosslinked thermoplastic elastomer was 84%. Composition of this TPV-2 was TPE-l/PP/softening agent= 40.4/37.3/22.4 (weight ratio).
(3) TPV-3
A crosslinked thermoplastic elastomer was obtained in the same manner as in the above (1), except that the composition and the ratio of TPE-1/PP/POX/DVB was changed to TPE-1/EP/POX/DVB=70.0/30.0/0.25/0.50 (weight ratio). Crosslinking degree of the resulting crosslinked thermoplastic elastomer was 62%. Composition of this TPV-3 was TPE-l/EP/softening agent=49.3/21.1/29.6 (weight ratio).
(4) TPV-4
A crosslinked thermoplastic elastomer was obtained in the same manner as in the above (1), except that TPE-1/PP/POX/DVB was changed to TPE-1/PP/HDPE/POX/DVB and the ratio was 70.0/30.0/5.0/0.5/1.0 (weight ratio). Crosslinking degree of the resulting crosslinked thermoplastic elastomer was 85%. Composition of this TPV-4 was TPE-1/PP/HDPE/softening agent=49.3/17.6/3.5/29.6 (weight ratio).
(5) TPV-5
A crosslinked thermoplastic elastomer was obtained in the same manner as in the above (1), except that TPE-1/PP/POX/DVB was changed to TPE-2/PP/POX/DVB. The crosslinking degree of the resulting crosslinked thermoplastic elastomer was nearly 100%. Composition of this TPV-5 was TPE-2/PP/softening agent=49.3/21.1/29.6 (weight ratio).
(6) TPV-6
A crosslinked thermoplastic elastomer was obtained in the same manner as in the above (1), except that TPE-l/PP/POX/DVB was changed to TPE-3/PP/POX/DVB. Crosslinking degree of the resulting crosslinked thermoplastic elastomer was nearly 100%. Composition of this TPV-6 was TPE-3/PP/softening agent=49.3/21.1/29.6 (weight ratio).
(7) TPV-7
A crosslinked thermoplastic elastomer was obtained in the same manner as in the above (1), except that TPE-1/PP/POX/DVB was changed to TPE-4/PP/POX/DVB. Crosslinking degree of the resulting crosslinked thermoplastic elastomer was about 82%. Composition of this TPV-6 was TPE-4/PP/softening agent=49.3/21.1/29.6 (weight ratio).

EXAMPLE 1

A twin-screw extruder (40 mmϕ, L/D=47) having a pouring port at the center of barrel was used as an extruder. As the screw, a double-thread screw having kneading parts before and after the pouring port was used. TPE-1/PS/HTR/POX/TAIC=65.0/35.0/5.9/0.50/1.0 (weight ratio) were mixed and melt-extruded at a cylinder temperature of 220° C. 39 Parts by weight of a softening agent (PW-380) based on 100 parts by weight of the total amount of TPE-1 and PS was poured from the pouring port provided at the center of the extruder to obtain pellets. Crosslinking degree of the resulting crosslinked thermoplastic elastomer was 82%. The pellets were molded by an injection molding machine (Toshiba IS45PNV) at 230° C. to obtain a molded product. Ratio of the components and characteristics of the molded product are shown in Table 1. The numerical value in ( ) in Table 1 is the composition of the components in the case of total amount of the components (A), (B) and (C) being 100 parts by weight. Composition of the resulting pellets was TPE-1/PS/HTR/softening agent=44.8/24.1/4.1/26.9 (weight ratio).

EXAMPLE 2

Pellets of a thermoplastic elastomer were obtained in the same manner as in Example 1, except that the composition and the ratio of TPE-1/PS/HTR/POX/TAIC were changed to TPE-l/PS/PP/HTR/POX/TAIC=65.0/26.2/8.8/5.9/0.50/1.0 (weight ratio) and the softening agent was poured in an amount of 39 parts by weight based on 100 parts by weight of the total amount of TPE-1, PS and PP. Crosslinking degree of the resulting crosslinked thermoplastic elastomer was 77%. Then, a molded product was obtained under the same conditions as in Example 1. Ratio of the components and characteristics of the molded product are shown in Table 1. The numerical value in ( ) in Table 1 is the composition of each component in the case of the total amount of the components (A), (B) and (C) being 100 parts by weight. Composition of the resulting pellets was TPE-l/PS/PP/HTR/softening agent=44.9/18.1/6.1/4.1/26.9 (weight ratio).

EXAMPLE 3

Pellets of a thermoplastic elastomer were obtained in the same manner as in Example 1, except that the composition and the ratio of TPE-1/PS/HTR/POX/TAIC were changed to TPE-1/PS/PP/HTR/POX/TAIC=65.0/17.5/17.5/5.9/0.50/1.0 (weight ratio) and the softening agent was poured in an amount of 39 parts by weight based on 100 parts by weight of the total amount of TPE-1, PS and PP. Crosslinking degree of the resulting crosslinked thermoplastic elastomer was 74%. Then, a molded product was obtained under the same conditions as in Example 1. Ratio of the components and characteristics of the molded product are shown in Table 1. The numerical value in ( ) in Table 1 is the composition of each component in the case of the total amount of the components (A), (B) and (C) being 100 parts by weight. Composition of the resulting pellets was TPE-1/PS/PP/HTR/softening agent=44.9/12.1/12.1/4.1/26.9 (weight ratio).

EXAMPLE 4

Pellets of a thermoplastic elastomer were obtained in the same manner as in Example 1, except that the composition and the ratio of TPE-1/PS/HTR/POX/TAIC were changed to TPE-1/PS/PP/HTR/POX/TAIC=65.0/8.8/26.2/5.9/0.50/1.0 (weight ratio). Crosslinking degree of the resulting crosslinked thermoplastic elastomer was 70%. Then, a molded product was obtained under the same conditions as in Example 1. Ratio of the components and characteristics of the molded product are shown in Table 1. The numerical value in ( ) in Table 1 is the composition of each component in the case of the total amount of the components (A), (B) and (C) being 100 parts by weight. Composition of the resulting pellets was TPE-1/PS/PP/HTR/softening agent= 44.9/6.1/18.1/4.1/26.9 (weight ratio).

EXAMPLE 5

Pellets of a thermoplastic elastomer were obtained in the same manner as in Example 1, except that the composition and the ratio of TPE-1/PS/HTR/POX/TAIC were changed to TPE-1/PS/PPE/HTR/POX/TAIC=65.0/28.0/7.0/5.9/0.50/1.0 (weight ratio) and the softening agent was poured in an amount of 39 parts by weight based on 100 parts by weight of the total amount of TPE-1, PS and PPE. Crosslinking degree of the resulting crosslinked thermoplastic elastomer was 81%. Then, a molded product was obtained under the same conditions as in Example 1. Ratio of the components and characteristics of the molded product are shown in Table 1. The numerical value in ( ) in Table 1 is the composition of each component in the case of the total amount of the components (A), (B) and (C) being 100 parts by weight. Composition of the resulting pellets was TPE-1/PS/PP/HTR/softening agent=44.9/19.3/4.8/4.1/26.9 (weight ratio).

EXAMPLE 6

A twin-screw extruder (40 mmφ, L/D=47) having a pouring port at the center of barrel was used as an extruder. As the screw, a double-thread screw having kneading parts before and after the pouring port was used. TPE-1/PS/POX/TAIC=65.0/35.0/0.50/1.0 (weight ratio) were mixed and melt-extruded at a cylinder temperature of 220° C. 39 Parts by weight of a softening agent (PW-380) based on 100 parts by weight of the total amount of TPE-1 and PS was poured from the pouring port provided at the center of the extruder and 5.9 parts by weight of HTR based on 100 parts by weight of the total amount of TPE-1 and PS was poured from a pouring port provided in the latter half portion of the extruder to obtain pellets. Crosslinking degree of the resulting crosslinked thermoplastic elastomer was 82%. Then, the pellets were molded by an injection molding machine (Toshiba IS45PNV) at 23° C. to obtain a molded product. Ratio of the components and characteristics of the molded product are shown in Table 1. The numerical value in ( ) in Table 1 is the composition of each component in the case of the total amount of the components (A), (B) and (C) being 100 parts by weight. Composition of the resulting pellets was TPE-1/PS/HTR/softening agent=44.9/24.2/4.1/26.9 (weight ratio).

COMPARATIVE EXAMPLE 1

Pellets of a thermoplastic elastomer were obtained in the same manner as in Example 1, except that the composition and the ratio of TPE-1/PS/HTR/POX/TAIC were changed to TPE-1/PP/POX/TAIC=65.0/35.0/0.50/1.0 (weight ratio). Crosslinking degree of the resulting crosslinked thermoplastic elastomer was 65%. Then, a molded product was obtained under the same conditions as in Example 1. Composition of each component and characteristics of the molded product are shown in Table 1. Composition of the resulting pellets was TPE-1/PP/softening agent=46.8/25.2/28.1 (weight ratio).

COMPARATIVE EXAMPLE 2

A thermoplastic elastomer was obtained in the same manner as in Example 1, except that the composition of TPE-1/PS/POX/TAIC was changed to ESP/PS/POX/TAIC=65.0/35.0/0.5/1.0 (weight ratio) and HTR was not added. Crosslinking degree of the resulting crosslinked thermoplastic elastomer was 42%. A molded product obtained by molding the resulting pellets had a hardness A of 87. This molded product was soft at room temperature and had the properties as an elastomer, but when this was cooled to −10° C. this became hard to result in deterioration of performance as elastomer. On the other hand, even when the molded product obtained in Example 1 was cooled to −10° C. the performance of the molded product did not change and was the same as the performance at room temperature, and thus the molded product showed excellent performance as elastomer. Composition of the resulting thermoplastic elastomer was ESP/PS/softening agent=46.8/25.2/28.1 (weight ratio).

EXAMPLES 7–19 AND COMPARATIVE EXAMPLES 3–5

PS, olefinic thermoplastic elastomer and compatibilizing agent with the composition as shown in Tables 2 and 3 were pelletized by melt-kneading extrusion using a twin-screw extruder (40 mmφ, L/D-47). The cylinder temperature was 220° C. The resulting pellets were molded by an injection molding machine (Toshiba IS45PNV) to obtain a molded product. Ratio of the components and characteristics of the molded product are shown in Tables 2 and 3. The numerical value in ( ) in Table 1 is the composition of each component in the case of the total amount of the components (A), (B) and (C) being 100 parts by weight. The results obtained when PS was replaced with PA6 are also shown together.

TABLE 1

| Formulation and composition and properties of molded products | Example 1 | Example 2 | Example 3 | Example 4 | Example 5 | Example 6 | Comp. Example 1 |
|---|---|---|---|---|---|---|---|
| Formulation | | | | | | | |
| PS | 35.0 | 26.2 | 17.5 | 8.8 | 28.0 | 35.0 | |
| PP | | 8.8 | 17.5 | 26.2 | | | 35.0 |
| PPE | | | | | 7.0 | | |
| TPE-1 | 65.0 | 65.0 | 65.0 | 65.0 | 65.0 | 65.0 | 65.0 |
| HTR | 5.9 | 5.9 | 5.9 | 5.9 | 5.9 | 5.9 | |

TABLE 1-continued

| Formulation and composition and properties of molded products | Example 1 | Example 2 | Example 3 | Example 4 | Example 5 | Example 6 | Comp. Example 1 |
|---|---|---|---|---|---|---|---|
| Softening agent | 39.0 | 39.0 | 39.0 | 39.0 | 39.0 | 39.0 | 39.0 |
| Composition | | | | | | | |
| Component (A) | | | | | | | |
| Polystyrene resin | 24.1 (33.0) | 18.1 (24.8) | 12.1 (16.6) | 6.1 (8.3) | 19.3 (26.4) | 24.2 (33.1) | |
| Polyolefin resin PP | | 6.1 (8.3) | 12.1 (16.6) | 18.1 (24.8) | | | 25.2 (35.0) |
| Polyphenylene ether resin | | | | | 4.8 (6.6) | | |
| Component (B) | 44.8 (61.3) | 44.9 (61.4) | 44.9 (61.4) | 44.9 (61.4) | 44.9 (61.4) | 44.9 (61.4) | 46.8 (65.0) |
| Component (C) | 4.1 (5.6) | 4.1 (5.6) | 4.1 (5.6) | 4.1 (5.6) | 4.1 (5.6) | 4.1 (5.6) | |
| Softening agent | 26.9 (36.8) | 26.9 (36.8) | 26.9 (36.8) | 26.9 (36.8) | 26.9 (36.8) | 26.9 (36.8) | 28.1 (39.1) |
| Proportion of polystyrene resin in Component (A) | 100 | 74.9 | 50.0 | 25.1 | 80.0 | 100 | 0 |
| Properties | | | | | | | |
| A hardness | 78 | 77 | 75 | 73 | 79 | 77 | 72 |
| Tensile strength (MPa) | 6.5 | 7.5 | 8.0 | 8.0 | 5.2 | 4.9 | 7.6 |
| Tensile elongation (%) | 200 | 310 | 420 | 520 | 150 | 120 | 650 |
| Compression set (%) | 81 | 77 | 67 | 55 | 84 | 83 | 52 |
| Abrasion resistance (g) | 0.020 | 0.025 | 0.030 | 0.040 | 0.021 | 0.021 | 0.140 |
| Adhesion to HIPS | ◉ | ◉ | Δ | X | ◉ | ◉ | X |
| Coatability | ○ | ○ | Δ | X | ○ | ○ | X |

*The numerical value in ( ) is a value when the total amount of the components (A), (B) and (C) is assumed to be 100 parts by weight.

TABLE 2

| Formulation and Composition and Properties of Molded Products | Example 7 | Example 8 | Comp. Example 3 | Comp. Example 4 | Example 9 | Example 10 | Example 11 | Example 12 | Example 13 | Example 14 | Example 15 |
|---|---|---|---|---|---|---|---|---|---|---|---|
| Formulation | | | | | | | | | | | |
| PS | 18.8 | 19.4 | 20.0 | | 19.4 | 19.4 | 19.4 | 19.4 | 19.4 | 9.7 | 24.3 |
| TPV-1 | 75.2 | 77.6 | 80.0 | | | | | | | 87.3 | 72.8 |
| TPV-2 | | | | 100 | | | | | | | |
| TPV-3 | | | | | 77.6 | | | | | | |
| TPV-4 | | | | | | 77.6 | | | | | |
| TPV-5 | | | | | | | 77.6 | | | | |
| TPV-6 | | | | | | | | 77.6 | | | |
| TPV-7 | | | | | | | | | 77.6 | | |
| HTR | 6.0 | 3.0 | 0 | | 3.0 | 3.0 | 3.0 | 3.0 | 3.0 | 3.0 | 3.0 |
| Composition | | | | | | | | | | | |
| Component (A) | | | | | | | | | | | |
| Polystyrene resin | 18.8 (24.2) | 19.4 (25.2) | 20.0 (26.2) | | 19.4 (25.2) | 19.4 (25.2) | 19.4 (25.2) | 19.4 (25.2) | 19.4 (25.2) | 9.7 (13.1) | 24.3 (31.0) |
| Polyolefin resin PP | 15.9 (20.4) | 16.4 (21.3) | 16.9 (22.1) | 37.3 (48.0) | | 13.7 (17.8) | 16.4 (21.3) | 16.4 (21.3) | 16.4 (21.3) | 18.4 (24.8) | 15.4 (19.6) |
| EP | | | | | 16.4 (21.3) | | | | | | |
| HDPE | | | | | | 2.7 (3.5) | | | | | |
| Component (B) | 37.1 (47.7) | 38.3 (49.7) | 39.4 (51.6) | 40.4 (52.0) | 38.3 (49.7) | 38.3 (49.7) | 38.3 (49.7) | 38.3 (49.7) | 38.3 (49.7) | 43.0 (58.0) | 35.9 (45.7) |
| Component (C) | 6.0 (7.7) | 3.0 (3.9) | 0 | | 3.0 (3.9) | 3.0 (3.9) | 3.0 (3.9) | 3.0 (3.9) | 3.0 (3.9) | 3.0 (4.0) | 3.0 (3.8) |
| Softening agent | 22.2 (28.7) | 23.0 (29.8) | 23.7 (31.1) | 22.4 (28.8) | 23.0 (29.8) | 23.0 (29.8) | 23.0 (29.8) | 23.0 (29.8) | 23.0 (29.8) | 25.8 (35.8) | 21.5 (27.4) |
| Proportion of polystyrene resin in component (A) | 54.3 | 54.2 | 54.2 | 0 | 54.2 | 54.2 | 54.2 | 54.2 | 54.2 | 34.6 | 61.3 |
| Properties | | | | | | | | | | | |
| A hardness | 88 | 87 | Phase sepa- ration | 87 | 86 | 85 | 87 | 86 | 84 | 84 | 93 |
| Tensile strength (MPa) | 6.4 | 5.8 | | 9.6 | 5.7 | 6.2 | 5.3 | 3.9 | 5.0 | 7.6 | 4.7 |
| Tensile elongation (%) | 150 | 160 | | 590 | 170 | 160 | 170 | 200 | 220 | 300 | 120 |

TABLE 2-continued

| Formulation and Composition and Properties of Molded Products | Example 7 | Example 8 | Comp. Example 3 | Comp. Example 4 | Example 9 | Example 10 | Example 11 | Example 12 | Example 13 | Example 14 | Example 15 |
|---|---|---|---|---|---|---|---|---|---|---|---|
| Compression set (%) | 73 | 74 | 57 | 76 | 75 | 71 | 72 | 70 | 62 | 81 |
| Abrasion resistance (g) | 0.025 | 0.023 | 0.065 | 0.022 | 0.024 | 0.025 | 0.028 | 0.026 | 0.042 | 0.015 |
| Adhesion to HIPS | ○ | ○ | x | ○ | ○ | ○ | ○ | ○ | x | ○ |
| Coatability | ○ | ○ | x | ○ | ○ | ○ | ○ | ○ | Δ | ○ |

*The numerical value in ( ) is a value when the total amount of the Components (A), (B) and (C) is assumed to be 100 parts by weight.

TABLE 3

| Formulation and composition and properties of molded products | Example 16 | Example 17 | Example 18 | Example 19 | Comp. Example 5 |
|---|---|---|---|---|---|
| Formulation | | | | | |
| PS | | | 19.4 | 19.4 | |
| MS | 18.8 | | | | |
| BS | | 18.8 | | | |
| PA6 | | | | | 188 |
| TPV-1 | 75.2 | 75.2 | 77.6 | 77.6 | 75.2 |
| HTR | 6.0 | 6.0 | | | |
| SGP | | | 3.0 | | |
| ESP | | | | 3.0 | |
| M-PP | | | | | 6.0 |
| Composition | | | | | |
| Component (A) | | | | | |
| Polystyrene resin | 18.8 | 18.8 | 19.4 | 19.4 | |
| | (24.2) | (24.2) | (25.2) | (25.2) | |
| Polyolefin resin PP | 15.9 | 15.9 | 16.4 | 16.4 | 15.9 |
| | (20.4) | (20.4) | (21.3) | (21.3) | (20.4) |
| Polyamide resin | | | | | 18.8 |
| | | | | | (24.2) |
| Properties | | | | | |
| Component (B) | 37.1 | 37.1 | 38.3 | 38.3 | 37.1 |
| | (47.7) | (47.7) | (49.7) | (49.7) | (47.7) |
| Component (C) | 6.0 | 6.0 | 3.0 | 3.0 | 6.0 |
| | (7.7) | (7.7) | (3.9) | (3.9) | (7.7) |
| Softening agent | 22.2 | 22.2 | 23.0 | 23.0 | 22.2 |
| | (28.7) | (28.7) | (29.8) | (29.8) | (28.7) |
| Proportion of polystyrene resin in component (A) | 54.3 | 54.2 | 54.2 | 54.2 | — |
| A hardness | 86 | 89 | 88 | 88 | 89 |
| Tensile strength (MPa) | 6.2 | 6.7 | 5.1 | 5.3 | 5.9 |
| Tensile elongation (%) | 160 | 143 | 165 | 160 | 170 |
| Compression set (%) | 73 | 71 | 74 | 72 | 85 |
| Abrasion resistance (g) | 0.028 | 0.021 | 0.024 | 0.023 | 0.072 |
| Adhesion to HIPS | ○ | ○ | ○ | ○ | — |
| Coatability | ○ | ○ | ○ | ○ | — |

*The numerical volume in ( ) is a value when the total amount of the components (A), (B) and (C) is assumed to be 100 parts by weight.

What is claimed is:

1. A thermoplastic elastomer composition which consists essentially of (A) a thermoplastic resin containing a polystyrene resin as a matrix component, (B) a rubbery polymer obtained by partially or completely crosslinking an ethylene-α-olefin copolymer as discrete components, and (C) a compatibilizing agent, the amount of the component (B) being 40–90 parts by weight and the amount of the component (C) being 0.1–40 parts by weight based on 100 parts by weight of the components (A), (B) and (C) in total,
wherein the ethylene-α-olefin copolymer is partially or completely crosslinked using an organic radical initiator.

2. A thermoplastic elastomer composition according to claim 1, wherein the thermoplastic resin consists of a polystyrene resin.

3. A thermoplastic elastomer composition according to claim 1, wherein the thermoplastic resin comprises a polystyrene resin and a polyolefin resin.

4. A thermoplastic elastomer composition according to claim 1 or 3, wherein the thermoplastic resin contains not less than 1% by weight and less than 40% by weight of a polystyrene resin based on the weight of the thermoplastic resin.

5. A thermoplastic elastomer composition according to claim 1 or 3, wherein the thermoplastic resin contains not less than 40% by weight and less than 100% by weight of a polystyrene resin based on the weight of the thermoplastic resin.

6. A thermoplastic elastomer composition according to claim 3, wherein the polyolefin resin is mainly composed of a polypropylene resin.

7. A thermoplastic elastomer composition according to claim 1, wherein the ethylene-α-olefin copolymer is a copolymer, comprising 47.5 wt % or more of ethylene and an α-olefin of 3–20 carbon atoms.

8. A thermoplastic elastomer composition according to claim 1, wherein the ethylene-α-olefin copolymer is a copolymer obtained by polymerization using a metallocene catalyst.

9. A thermoplastic elastomer composition according to claim 1, wherein the ethylene-α-olefin copolymer is a copolymer, comprising 47.5 wt % or more of ethylene and an α-olefin of 6–20 carbon atoms.

10. A thermoplastic elastomer composition according to claim 1, wherein the compatibilizing agent is at least one copolymer selected from the group consisting of block copolymers, graft copolymers and random copolymers of a component (X) compatible with polystyrene and a component (Y) compatible with polyolefin.

11. A thermoplastic elastomer composition according to claim 1, wherein the ethylene-α-olefin copolymer is a copolymer, which is, by weight, mainly composed of ethylene and an α-olefin of 4–20 carbon atoms.

12. A thermoplastic elastomer composition according to claim 1, wherein the polystyrene resin is a homopolymer of a styrene monomer or a copolymer of a styrene monomer and at least one monomer which is selected from the group consisting of α-methylstyrene, p-chlorostyrene, p-bromostyrene, 2,4,5-tribromostyrene, methyl acrylate, butyl acrylate, methyl methacrylate, ethyl methacrylate, itaconic anhydride, maleimide, N-methylmaleimide, N-phenylmaleimide, acrylic acid and methacrylic acid.

13. A thermoplastic elastomer composition according to claim 1, wherein the polystyrene resin is a homopolymer of a styrene monomer.

14. A method for producing the thermoplastic elastomer composition of claim 1 which comprises dynamically crosslinking a thermoplastic resin containing a polystyrene resin, an ethylene-α-olefin copolymer and a compatibilizing agent in the presence of a crosslinking agent.

15. A method for producing the thermoplastic elastomer composition of claim 3 which comprises dynamically crosslinking a polyolefin resin and an ethylene-α-olefin copolymer in the presence of a crosslinking agent to prepare an olefin thermoplastic elastomer and then melt-mixing or pellet-blending the olefin thermoplastic elastomer, a polystyrene resin and a compatibilizing agent.

* * * * *